United States Patent
Xu et al.

(10) Patent No.: US 9,967,205 B2
(45) Date of Patent: May 8, 2018

(54) RESOURCE DOWNLOADING METHOD AND APPARATUS

(71) Applicant: NetEase (Hangzhou) Network Co., Ltd., Hangzhou (CN)

(72) Inventors: Fei Xu, Hangzhou (CN); Zijing Guan, Hangzhou (CN)

(73) Assignee: NetEase (Hangzhou) Network Co., Ltd., Hangzhou (CN)

( * ) Notice: Subject to any disclaimer, the term of this patent is extended or adjusted under 35 U.S.C. 154(b) by 239 days.

(21) Appl. No.: 14/734,130

(22) Filed: Jun. 9, 2015

(65) Prior Publication Data
US 2015/0365350 A1    Dec. 17, 2015

(30) Foreign Application Priority Data
Jun. 12, 2014   (CN) .......................... 2014 1 0260637

(51) Int. Cl.
*G06F 15/173*   (2006.01)
*H04L 12/911*   (2013.01)
*H04L 12/873*   (2013.01)

(52) U.S. Cl.
CPC ............ *H04L 47/822* (2013.01); *H04L 47/52* (2013.01)

(58) Field of Classification Search
USPC ........................................ 709/226, 223, 224
See application file for complete search history.

(56) References Cited

U.S. PATENT DOCUMENTS

| 9,344,876 B2 * | 5/2016 | Shabtai ................... H04L 67/06 |
| 2009/0183218 A1 * | 7/2009 | Li ..................... H04N 21/23103 725/114 |
| 2009/0254652 A1 * | 10/2009 | Binswanger ............ H04L 12/24 709/224 |

(Continued)

FOREIGN PATENT DOCUMENTS

| CN | 101626391 A | 1/2010 |
| CN | 102238156 A | 11/2011 |

(Continued)

OTHER PUBLICATIONS

State Intellectual Property Office of China, First Notification of Office Action Issued in Chinese Counterpart Application No. 201410260637.4, dated Nov. 16, 2016, 6 pp.

(Continued)

*Primary Examiner* — Lan-Dai T Truong
(74) *Attorney, Agent, or Firm* — Fitch, Even, Tabin & Flannery LLP

(57) ABSTRACT

Embodiments of the present invention provide a resource downloading method and apparatus. The method includes: intercepting an access request for current resources; finding, through a resource relationship index file, resources which have dependency relationships with the current resources and do not exist locally on the client as predicted resources, wherein the resource relationship index file is generated in advance according to dependency relationships between individual resources in the full client of a network application; and allocating a first thread from unoccupied threads available for downloading the predicted resources, and downloading the predicted resources locally to the client using the first thread. In addition, embodiments of the present invention provide a resource downloading apparatus.

18 Claims, 6 Drawing Sheets

(56) References Cited

U.S. PATENT DOCUMENTS

| | | | |
|---|---|---|---|
| 2012/0167075 A1 | 6/2012 | Tepper | |
| 2012/0324471 A1* | 12/2012 | Yanagisawa | G06F 11/3409 718/105 |
| 2014/0237026 A1* | 8/2014 | Tang | H04L 67/06 709/203 |
| 2016/0198497 A1* | 7/2016 | Yu | H04W 74/08 370/330 |

FOREIGN PATENT DOCUMENTS

| | | |
|---|---|---|
| CN | 102591682 A | 7/2012 |
| CN | 102736940 A | 10/2012 |
| CN | 103544025 A | 1/2014 |
| CN | 103795761 A | 5/2014 |
| WO | 2014008854 A1 | 1/2014 |

OTHER PUBLICATIONS

State Intellectual Property Office of China, Search Report Issued in Chinese Counterpart Application No. 210410260637.4, dated Nov. 16, 2016, 4 pp.

\* cited by examiner

RESOURCE DOWNLOADING METHOD AND APPARATUS

CROSS-REFERENCE TO RELATED APPLICATIONS

This application claims the benefit and priority of Chinese patent application CN 201410260637.4 filed on Jun. 12, 2014. The entire disclosure of the above application is incorporated herein by reference.

TECHNICAL FIELD

The embodiments according to the present invention relate to the field of information technology, and more particularly, to a resource downloading method and apparatus.

BACKGROUND

This section is intended to provide the background or context for the embodiments according to the present invention as recited in the claims. What is described herein is not admitted to be prior art by inclusion in this section.

Many network applications provide a corresponding client program (also referred to as client, for short) for installation on a user terminal equipment. Regarding a network application providing a client, firstly, the client of the network application needs to be downloaded and installed on a user terminal equipment, then the user may realize the use and experience of the network application on the client through information interaction between the client and server. By providing the network application to the user through the client, some data of the network application can be stored locally at the user terminal equipment along with the client, thereby avoiding the download of all the data from the server every time the user uses the network application, and reducing the amount of data to be downloaded by the user upon using the network application and the occupation of network resources during the use of the network application.

However, as the amount of data involved in the network application becomes increasingly larger, the amount of data of resources contained in the client of the network application is also growing, leading to increasingly longer time required to be spent by the user to download the client, which causes not only inconvenience to the use of the user, but also the loss of many users of the network application during the client downloading process. In order to save the time it takes for the user to download the client so as to allow the user to proceed to the use and experience of the network application as early as possible, some existing network applications employ a micro-client (also referred to as micro-end, for short) technology. Specifically, in the micro-client technology, the client (i.e., micro-end) provided to the user to download only contains resources necessary for the initial use of the network application. During the running of the client, by taking over the file access of the client, when it is found that a resource the client currently requests to access does not exist locally on the client, the resource is downloaded from the server until all resources provided by the network application to the user are downloaded locally to the client, thereby forming a full client on the user terminal equipment. With the micro-client technology, the user may download resources of the network application while using the network application, without having to wait for the completion of the download of a full client to use the network application, thereby reducing the amount of data of initial resources in the client to be downloaded by the user, and saving the time it takes for the user to download the client.

However, as dependency relationships between resources of a network application become increasingly complex, the amount of resources needed to be accessed by the client in certain resource loading processes is also growing. At this point, regarding the resources needed in a current loading process, the client often does not request to access all of the resources at once during the resource loading process, but requests to access a part of the resources respectively in multiple times. Specifically, during the resource loading process, the client first initiates an access request for a part of the resources, parses this part of the resources when they are accessed, and then initiates an access request for a next part of the resources until the resources needed by the current resource loading process have all been downloaded to complete the current resource loading process. For example, as for a three dimensional (3D) online game, compared with a two dimensional (2D) online game, the resources needed to be loaded by the 3D game when the client loads a character or a scene are far more than that of the 2D game. For the same process of loading a character or a scene, the client of the 2D game typically only needs to load picture files, whereas the client of the 3D game needs to first obtain a model description file of the character or the scene, find files such as maps, animations and special effects to be accessed by parsing the description file, and then obtain the files such as maps, animations and special effects thus found, so as to complete the loading of the character or the scene. Furthermore, the character or the scene in the 3D game is typically more complex and may be comprised of multiple interdependent resource parts, each part needs to respectively go through the download and parsing of the description file and the download of the files such as maps, animations and special effects.

It can thus be seen that, for a network application like the 3D online game with such complex dependency relationships between resources, a chain of "parsing-downloading" required to go through in a resource loading process is relatively long; and for a resource loading process performed for the first time, since a client employing the micro-end technology in the prior art only downloads resources it currently requests to access and do not exist locally, the client needs to repeatedly download the resources it requests to access many times according to the "parsing-downloading" chain during the resource loading process, leading to long delay of the resource loading process, and causing a waste of downloading threads as the resources to which access is requested each time cannot usually occupy all of the downloading threads.

Therefore, in the prior art, upon loading resources having complex dependency relationships therebetween for the first time, the network application client employing the micro-end technology only downloads the resources it currently requests to access, not only causing the speed of resource loading of the client being relatively slow and the loading delay being relatively long, but also a waste of downloading threads, which is a very annoying process.

For this reason, a great need exists for an improved resource downloading method and apparatus to avoid the drawbacks of slow speed, long loading delay, and the waste of downloading threads of resource loading of the client caused by the fact that the network application client employing the micro-end technology in the prior art only downloads the resources it currently requests to access.

SUMMARY

In this context, the embodiments of the present invention aim to provide a resource downloading method and apparatus.

In a first aspect of the embodiments of the invention, there is provided a resource downloading method, including: intercepting an access request for current resources by a client; finding, through a resource relationship index file, resources which have dependency relationships with the current resources and do not exist locally on the client as predicted resources, wherein the resource relationship index file is generated in advance according to dependency relationships between individual resources in the full client of a network application; and allocating a first thread from unoccupied threads available for downloading the predicted resources, and downloading the predicted resources locally to the client using the first thread.

In a second aspect of the embodiments of the invention, there is provided a resource downloading apparatus, including: an access intercepting module for intercepting an access request for current resources; a predicted resource finding module for finding, through a resource relationship index file, resources which have dependency relationships with the current resources and do not exist locally on the client as predicted resources, wherein the resource relationship index file is generated in advance according to dependency relationships between individual resources in the full client of a network application; and a first downloading module for allocating a first thread from unoccupied threads available for downloading the predicted resources, and downloading the predicted resources locally to the client using the first thread.

In a third aspect of the embodiments of the invention, a system is provided, wherein the system for example can include one or more processing devices, and one or more machine-readable media configured to store instructions that are executable by the one or more processing devices to perform operations including: intercepting an access request for current resources by a client; finding, through a resource relationship index file, resources which have dependency relationships with the current resources and do not exist locally on the client as predicted resources, wherein the resource relationship index file is generated in advance according to dependency relationships between individual resources in the full client of a network application; and allocating a first thread from unoccupied threads available for downloading the predicted resources, and downloading the predicted resources locally to the client using the first thread.

BRIEF DESCRIPTION OF THE DRAWINGS

The above and other objectives, features and advantages of exemplary embodiments of the invention will become more readily understandable by reading the following detailed description with reference to the accompanying drawings. A number of embodiments of the invention are shown in an exemplary and unrestrictive manner in the drawings, of which.

In the drawings, identical or corresponding numerals denote identical or corresponding parts.

DETAILED DESCRIPTION OF THE INVENTION

Figure 1:
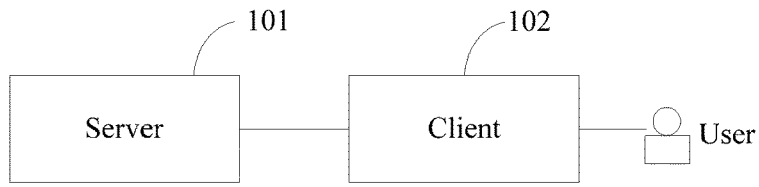
FIG. 1 schematically illustrates a framework diagram of an exemplary application scenario of the embodiments of the invention.

The principles and spirit of the present invention will be described below with reference to a number of exemplary embodiments. It should be understood that, those embodiments are given merely for those skilled in the art to better understand and thus implement the invention, and do not limit the scope of the invention in any way. On the contrary, those embodiments are provided to make the disclosure more thorough and complete, so that the scope of the disclosure may be completely conveyed to those skilled in the art.

It is known to those skilled in the art that, the embodiments of the invention may be implemented as a system, device, apparatus, method or computer program product. Thus, the present disclosure may be specifically implemented in the form of complete hardware, complete software (including firmware, resident software, microcode, etc.), or combination of hardware and software.

A resource downloading method and apparatus are proposed in accordance with the embodiments of the invention.

It is to be understood that, in this context, the term "micro-end" represents a client program provided by a network application developer for installation on a user equipment, which is capable of, during the running, judging whether current resources to which access is requested exist locally on the client when initiating an access request, so as to download the current resources that do not exist locally from the server. Wherein, the term "resource" represents various files and data that the network application has in its client program; a "resource" may correspond to either a file or a plurality of files, which is not limited herein. Moreover, any number of elements in the drawings is intended to be illustrative rather than limiting, and any naming is used merely for distinguishing purpose without any meaning of limitation.

The principles and spirit of the present invention will be described in details below, with reference to a number of representative embodiments of the invention.

The inventors have found that, in the existing micro-end technology, a client only downloads resources it currently requests to access when initiating an access request; therefore, if resources to be loaded during a resource loading process performed for the first time have complex dependency relationships therebetween, the client needs to repeatedly download resources for multiple times according to the order of access, what is downloaded each time is only the resources the client currently requests to access, and often the download of the resources the client currently requests to access would not occupy all threads, resulting in that not all of the threads are used simultaneously to download resources to be loaded during the resource loading process, which not only causes the speed of resource loading of the client being relatively slow and the loading delay being relatively long, but also a waste of downloading threads.

Based on the above analysis, the basic idea of the present invention is as follows: in order to cause as many threads as possible to be used simultaneously to download resources during the resource loading process instead of downloading only the resources the client currently requests to access, it is possible to determine in advance which resources are resources to be accessed during the resource loading process, that is, it is possible to predict resources that the client does not currently request to access but will request to access very soon, thereby downloading the predicted resources using unoccupied threads other than those threads used for downloading resources to which access is currently requested, this not only accelerates the speed of downloading the resources to be loaded during the resource loading process so as to accelerate the speed of resource loading and shorten the loading delay, but also makes the downloading threads to be fully utilized. Wherein, since the resources to be loaded during the resource loading process have dependency relationships therebetween, the prediction may be specifically performed by way of finding resources having dependency relationships with the current resources to which access is currently requested as predicted resources, through a resource relationship index file generated in advance according to dependency relationships between resources in the full client.

It should be noted that, in this context, the terms such as "current resource" and "predicted resource" indicate the degree of urgency of the need for resources by the client. For example, "current resource" represents a resource to which an access request initiated by the client is directed. For another example, "predicted resource" represents a resource having a dependency relationship with the current resource, found through the resource relationship index file.

Having presented the basic principles of the present invention, various non-limiting embodiments of the invention will be described below with particularity.

First, referring to FIG. 1, which is a framework diagram of an exemplary application scenario of the embodiments of the invention. Wherein, a user interacts with a server 101 providing network application service through a client 102 on a user equipment. It can be understood by those skilled in the art that the framework diagram as shown in FIG. 1 is only one example in which the embodiments of the invention may be implemented. The applicable scope of the embodiments of the invention is not limited by this framework in any respect.

It should be noted that the user equipment herein may be any user equipment that is currently available, under development, or developed in the future, and is capable of achieving interaction between the client 102 thereon and the server 101 through any form of wired and/or wireless connection (e.g., Wi-Fi, LAN, cell network, coaxial cable, etc.), including but not limited to: a smartphone, a feature phone, a tablet computer, a laptop PC, a desktop PC, a small computer, a medium computer, a mainframe computer, etc. that is currently available, under development, or developed in the future.

It should also be noted that the server 101 herein is only an example of device capable of providing network application service to a user, which is currently available, under development, or developed in the future. There is no limitation to the embodiments of the invention in this respect.

Based on the framework shown in FIG. 1, the client 102 may first intercept an access request for current resources, and then find, through a resource relationship index file, resources which have dependency relationships with the current resources and do not exist locally on the client as predicted resources, wherein the resource relationship index file is a file that records corresponding relationships between resources having dependency relationships, generated in advance according to dependency relationships between individual resources in the full client of the network application. Then, the client 102 may allocate a first thread from unoccupied threads available for downloading the predicted resources, and download the predicted resources to the client using the first thread.

It may be appreciated that, in the application scenario of the present invention, although actions of the embodiments of the invention are described as being executed by the client 102 here and below, those actions may be partly executed by the client 102, partly executed by the server 101, or completely executed by the server 101. The present invention is not limited in respect of the executing subject so long as the actions disclosed by the embodiments of the present invention are executed.

Methods for resource downloading according to the exemplary embodiments of the present invention will be described below with reference to FIGS. 2-8, in connection with the application scenario of FIG. 1. It should be noted that the above application scenario is shown merely to facilitate the understanding of the spirit and principles of the invention, and there is no limitation to the embodiments of the invention in this respect. On the contrary, the embodiments of the invention may be applicable to any suitable scenario.

Figure 2:
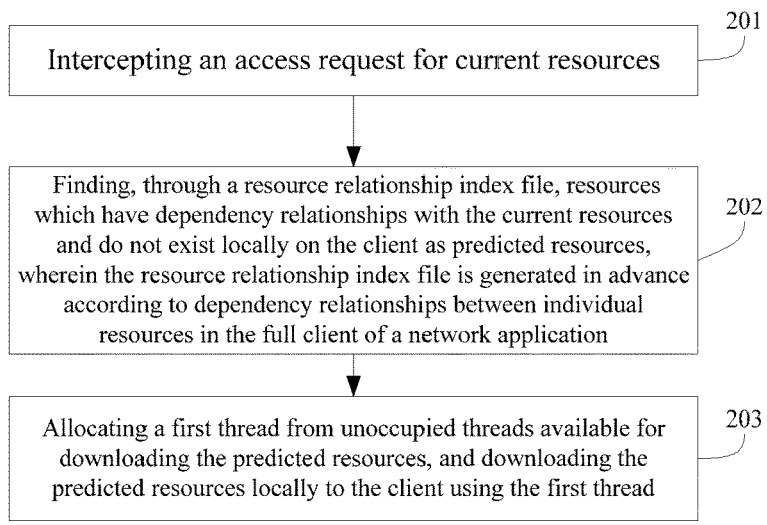
FIG. 2 schematically illustrates a flow diagram of an example of the resource downloading method of the invention.

Referring to FIG. 2, there is shown a flow diagram of an example of the resource downloading method of the invention. In this example, the method may for example specifically include the following steps:

Step 201: intercepting an access request for current resources.

During the running of a client employing the micro-end technology, if it initiates an access request, the access request may be intercepted to determine the current resources to which the access request is directed. It may be appreciated that the current resources may be determined by intercepting the access request in order to, on the one hand, download the current resources from a server locally to the client in the case that the current resources do not exist thereon, and on the other hand, to predict, through the current resources, resources which will be accessed next by the client so as to achieve pre-download of predicted resources before the client requests to access them.

Step 202: finding, through a resource relationship index file, resources which have dependency relationships with the current resources and do not exist locally on the client as predicted resources, wherein the resource relationship index file is generated in advance according to dependency relationships between individual resources in the full client of a network application.

Wherein, the resource relationship index file may record corresponding relationships between resources having dependency relationships, and it may either be placed in advance in the client serving as the micro-end to be provided to a user equipment when downloading the client, or downloaded from the server by the client on the user equipment during the running thereof.

It may be appreciated that the resource relationship index file needs to be generated in advance according to dependency relationships between individual resources in the full client of the network application.

Wherein, the resources having dependency relationships may refer to resources which need to be loaded to complete a resource loading process. Those resources having dependency relationships need to be accessed in multiple times, and each of the resources indicates resources that need to be accessed after it is accessed. That is, by parsing each of the resources, it is possible to determine which resources need to be accessed after the access thereto.

In this example, dependency relationships representing the order of access between individual resources of the full client during the resource loading process may be determined in advance by parsing the individual resources, and the resource relationship index file can be generated according to the dependency relationships. During the running of the client, resources having dependency relationships with the current resources may be found through the resource relationship index file, and those resources are resources that may be accessed after the client accesses the current resources. Therefore, those resources thus found are considered as predicted resources and unoccupied threads are used to download the predicted resources while accessing the current resources, so that the client may not need to download the predict resources when accessing them, thereby shortening the loading delay of the entire loading process.

Figure 3:
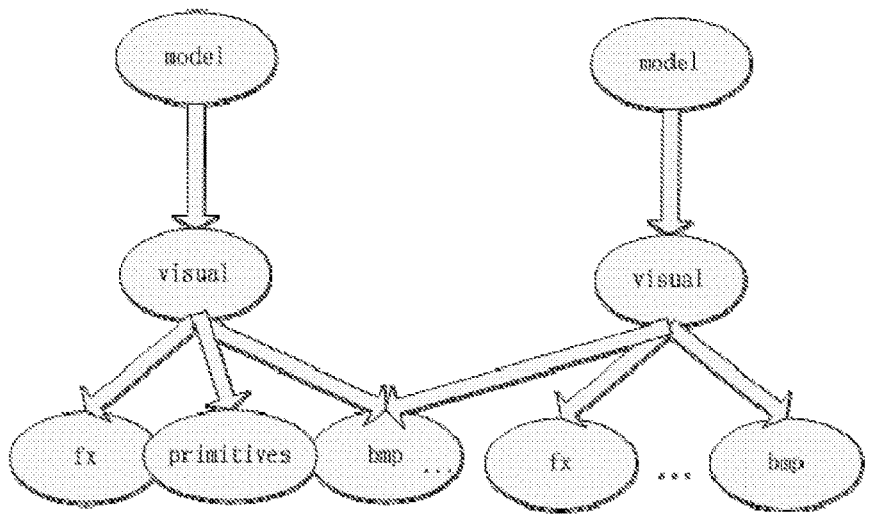
FIG. 3 schematically illustrates a schematic diagram of an example of dependency relationships between resources according to the invention.

For example, regarding the loading process of an entity in an online game, the entity is generally comprised of models, and a model is generally comprised of vertices and maps, with some models also having special effects. Regarding the loading of models in the online game, FIG. 3 illustrates a schematic diagram of an example of possible dependency relationships between resources. Wherein, "model" and "visual" are description files, both of which are used to identify and describe models and are usually stored in xml format in client engine; "fx" is a special effect file, "primitives" is a vertex file, and "bmp" is a map file. It can be seen that the two models in FIG. 3 have a shared map file, which means that the same map file in the resources of the full client may be shared by a plurality of models.

Taking an arbitrary one of the models in FIG. 3 as an example, the resources used by it may be regarded as a tree. When loading this model, the client of the online game may begin to read from a root node of the tree, parse a file of a node each time the node is read so as to obtain information of subnodes of the node, and then read the subnodes until the whole tree is read, so that the model can be constructed. For example, assuming that the model on the left of FIG. 3 is an a1 model, and its model file is a1.model, its visual file is a1.visual, its fx file is flash.fx, its primitives file is a1.primitives, and its bmp file is skin.bmp, then:

The content of a1.model may be:

```
<root>
   <visual>
     a1
   </visual>
</root>
```

The content of a1.visual may be:

```
<root>
   <fx>
     flash
   </fx>
   <primitive>
     a1
   </primitive>
   <texture>
     skin.bmp
   </texture>
</root>
```

It can thus be seen that resources having a dependency relationship with a1.model file may be a1.visual file, flash.fx file, a1.primitives file, and skin.bmp file. Furthermore, if a current resource to which an access request initiated by the client is directed is a1.model, then the predicted resources found through the resource relationship index file may include a1.visual, flash.fx, a1.primitives, and skin.bmp.

Step 203: allocating a first thread from unoccupied threads available for downloading the predicted resources, and downloading the predicted resources locally to the client using the first thread.

Referring to the example of the aforesaid a1 model, assuming a situation where the client is a micro-end, all files of the a1 model are on the server of the online game. At this point, during the initial loading of the a1 model, if the prior art is employed, the client only downloads the current resources to which access is currently initiated, so the loading process of the a1 model may be represented as: downloading a1.model→parsing a1.model→downloading a1.visual→parsing a1.visual→concurrently downloading flash.fx, a1.primitives and skin.bmp→completion of loading. Whereas in the present example, when the client initiates an access request for the current resources, in addition to the download of the a1.model as the current resource, the client may also download a1.visual, flash.fx, a1.primitives and skin.bmp as the predicted resources simultaneously using the unoccupied threads available for downloading the predicted resources, hence in the case that the number of available threads is ideal, the loading process of the a1 model may be represented as: downloading a1.model, a1.visual, flash.fx, a1.primitives, skin.bmp→loading files. Further considering that the speed of loading and parsing local files of the client is very fast so that the time it takes to load and parse the local files can be negligible, the main loading delay during the loading of the a1 model is caused by the file downloading. Assuming that the time it takes to perform file downloading each time is 100 ms, regarding the prior art, since the client only downloads the current resources to which access is currently initiated, it needs to perform downloading three times in total (in fact, the total time consumed is related to the number of layers of the resource tree), and the loading process of the a1 model needs to take 300 ms; regarding the present example, the client may download the predicted resources when initiating access to the current resources, so that it needs to perform concurrent downloading only one time in total, and the loading process of the a1 model needs to take 100 ms. It can thus be seen that the present example may substantially shorten the time delay of the resource loading process as compared with the prior art.

It should be noted that, the first thread for downloading the predicted resources in the present example is allocated from the unoccupied threads available for downloading the predicted resources. Since typically when the user uses the network application, the situation of the resource loading of the client is complex, and the dependency relationships between resources are also complex, while the network bandwidth is usually fixed. Therefore, in some embodiments of the present example, on the basis of downloading the predicted resources when the client initiates access to the current resources, the relationship between the amount of current resources to be downloaded, the amount of predicted resources, the number of available threads of the network bandwidth and the user's demands in the online game may also be taken into consideration to determine an allocation scheme of the first thread for downloading the predicted resources.

In some embodiments of the present example, considering that the client may simultaneously have a plurality of predicted resources to be downloaded, and a resource downloading task may be regarded as a blocking task, sometimes since a resource downloading task generated previously occupies a large number of threads, the number of unoccupied threads available for downloading the predicted resources would not meet the demand of downloading tasks of all the predicted resources generated later. For this reasons, a first task set used only for storing uncompleted predicted resource downloading tasks may be established. During the resource loading process of the client, the downloading tasks of all of the predicted resources may be added to the first task set, then the unoccupied threads available for downloading the predicted resources may be allocated for downloading tasks in the first task set, the downloading tasks to which the threads are allocated may be taken out from the first task set, and the allocated threads are used to complete the download of the predicted resources of the downloading tasks. Specifically, step 203 may for example include: adding a first downloading task for downloading the predicted resources to a first task set; and in response to the first downloading task being allocated with the first thread, taking out the first downloading task from the first task set and downloading the predicted resources locally to the client using the first thread. Wherein, the first task set may for example be a task queue. It may be appreciated that by adding downloading tasks of all of the predicted resources to the first task set, management of thread allocation for the predicted resource downloading tasks may be achieved to thereby avoid the influence of the insufficiency of the number of the unoccupied threads available for downloading the predicted resources on the download of the predicted resources.

Furthermore, considering that the probabilities of a plurality of predicted resources to be downloaded at the same moment being loaded next are not the same (the farther the dependency relationship is, the smaller the probability of being loaded next), some predicted resource downloading tasks added to the first task set at a certain moment are not allocated with a thread at next moment, so that the client might temporarily need not to access the predicted resources; however, at this point new predicted resource downloading tasks are added into the first task set, and the predicted resources of the new downloading tasks will be accessed next by the client. For example, during the running of the client of the online game, a player character of the user quickly passes through a first area. If the player character has already moved into a second area while the loading of the first area has not yet been completed, since the client at this point needs to load the scene of the second area and temporarily needs not to load the scene of the first area, what are needed to be downloaded by the client are predicted resources based on the second area at this point, not the predicted resources based on the first area not yet been allocated with threads. It can thus be seen that, relative to previously generated downloading tasks of predicted resources, later generated downloading tasks of predicted resources are tasks that the client needs to execute more urgently; therefore, on the basis that the aforesaid predicted resource downloading tasks are added to the first task set for processing, it is also possible to allocate threads for individual downloading tasks in the first task set in an order from the last to the first according to the times when the individual downloading tasks are added to the first task set. Specifically, step 203 may for example include: adding a first downloading task for downloading the predicted resources to a first task set; allocating threads for individual downloading tasks in the first task set from unoccupied threads available for downloading the predicted resources according to an allocation order of the first task set; and in response to the first downloading task being allocated with the first thread, taking out the first downloading task from the first task set and downloading the predicted resources locally to the client using the first thread. Wherein, the allocation order of the first task set is an order formed by arranging the individual downloading tasks in the first task set from the last to the first according to the times when the individual downloading tasks are added to the first task set. At this point, regarding a first downloading task, in the case that the first downloading task is the last downloading task added to the first task set and currently there exist unoccupied threads available for downloading the predicted resources, the first downloading task may be allocated with the first thread. In other words, the tasks in the task queue of the first task set are last in first out (LIFO).

In some other embodiments of the present example, considering that sometimes the client still have unoccupied threads after allocating threads for all of the current resources and all of the predicted resources, in order to avoid the waste of the unoccupied threads and to complete the download of the full client more quickly, it is also possible to, in response to the predicted resources having been allocated with the first thread and there still exist unoccupied threads available for downloading random resources, randomly select resources not existing locally on the client as the random resources, and download the random resources using the unoccupied threads available for downloading the random resources.

In some other embodiments of the present example, considering that the client may simultaneously execute a plurality of resource loading processes (e.g., the client of the online game simultaneously loads a plurality of models or entities), when all threads provided by the network bandwidth are insufficient to ensure that all current resources and all predicted resources can be allocated with threads simultaneously, since the current resources are resources that the client currently initiates a request to access and are more urgently needed resources as compared with the predicted resources for the client, it is also possible to preferentially allocate threads for the downloading tasks of the current resources, and the predicted resources may be allocated with threads after the current resources are allocated with threads. Such embodiments will be described in subsequent examples, and are not described in detail here.

It may be appreciated that, considering that sometimes previously allocated predicted resources and random resources may occupy all of the threads, this would cause difficulty for later current resources to obtain threads for downloading in time, thus leading to delay of the loading of the current resources. In order to avoid delay caused by exhaustion of threads when allocating threads for the current resources, threads available for downloading resources may be divided into two parts: one part of the threads are only used to download the current resources, and the other part of the threads are shared by current resource downloading, predicted resource downloading and random resource downloading. Specifically, the threads of the client available for downloading resources may for example include universal threads and dedicated threads, wherein the universal threads may be used to download the current resources, the predicted resources and the random resources, and the dedicated threads may only be used to download the current resources.

With the technical solution of the present example, since the predicted resources having dependency relationships with the current resources are resources to be accessed after the current resources are accessed, on the one hand, the predicted resources which need to be accessed after the current resources are accessed and do not exist locally may be downloaded in advance when the client initiates an access request for the current resources, without having to wait until the client initiates an access request for the predicted resources after accessing and parsing the current resources to download the predicted resources, thereby significantly reducing the number of resource downloading required when the client initiates an access request during the resource loading process, accelerating the speed of the initial loading of client resources, and shortening the loading delay of the resource loading process; on the other hand, threads not occupied by the current resources upon requesting access may be used to download the predicted resources, thereby avoiding the waste of downloading threads.

During the resource loading process of the client, usually neither the current resources nor the predicted resources exist locally on the client, so that the client needs to download the current resources as well as the predicted resources at the same moment. If at this point the threads provided by the network bandwidth are insufficient for allocation to all of the current resources and predicted resources, the current resources may be allocated with threads before the predicted resources to ensure that the client can load the current resources to which it currently initiates the access request as quickly as possible.

Figure 4:
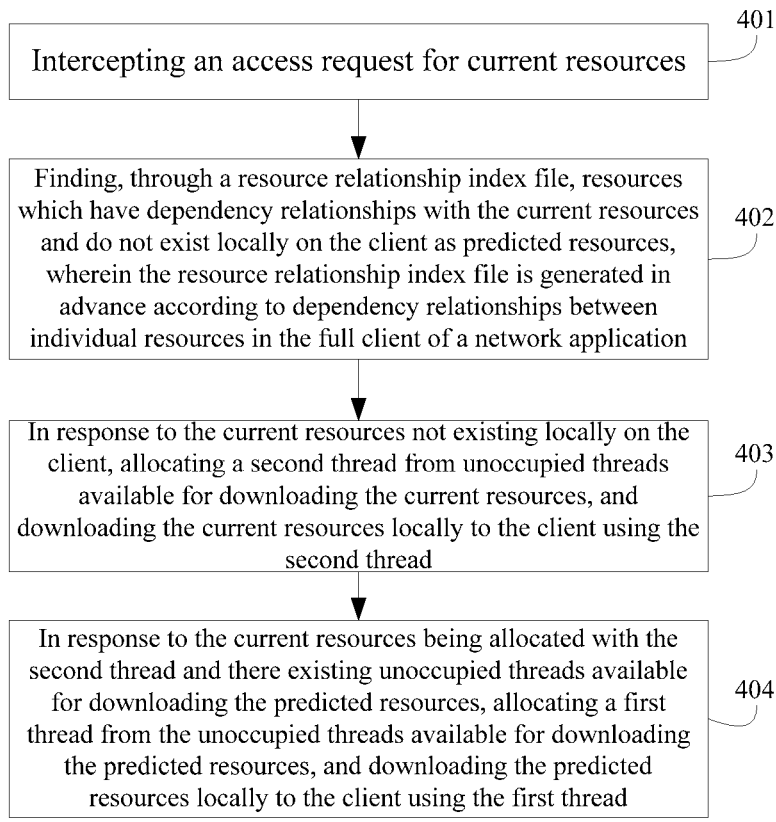
FIG. 4 schematically illustrates a flow diagram of another example of the resource downloading method of the invention.

Specifically, referring to FIG. 4, there is shown a flow diagram of another example of the resource downloading method of the invention. The method may for example include the following steps:

Step 401: intercepting an access request for current resources.

Step 402: finding, through a resource relationship index file, resources which have dependency relationships with the current resources and do not exist locally on the client as predicted resources, wherein the resource relationship index file is generated in advance according to dependency relationships between individual resources in the full client of the network application.

Step 403: in response to the current resources not existing locally on the client, allocating a second thread from unoccupied threads available for downloading the current resources, and downloading the current resources locally to the client using the second thread.

Wherein, the download of the current resources may not be affected by the process of finding the predicted resources. For example, after step 401 is performed, it is possible to find the currents resources locally on the client without waiting for step 420 to find the predicted resources. If the current resources can be found, the current resources are read locally on the client; if the current resources cannot be found, step 403 is performed to achieve the download of the current resources, that is, the performance of step 403 for downloading the current resources may be carried out simultaneously with the performance of step 402 for finding the predicted resources.

It should be noted that, in some embodiments of the present example, considering that the client may simultaneously have a plurality of models to be loaded, i.e., the client may simultaneously intercept a plurality of access requests, such that it needs to simultaneously download a plurality of current resources, and a resource downloading task may be regarded as a blocking task, sometimes since a resource downloading task generated previously occupies a large number of threads, the number of unoccupied threads available for downloading the current resources would not meet the demand of downloading tasks of all the current resources generated later; for this reasons, a second task set used only for storing uncompleted current resource downloading tasks may be established. During the resource loading process of the client, the downloading tasks of all of the current resources may be added to the second task set, then the unoccupied threads available for downloading the current resources may be allocated for downloading tasks in the second task set, the downloading tasks to which the threads are allocated may be taken out from the second task set, and the allocated threads are used to complete the download of the current resources of the downloading tasks. Specifically, step 403 may for example include: in response to the current resources not existing locally on the client, adding a second downloading task for downloading the current resources to a second task set; and in response to the second downloading task being allocated with the second thread, taking out the second downloading task from the second task set and downloading the current resources locally to the client using the second thread. Wherein, the second task set may for example be a task queue. It may be appreciated that by adding downloading tasks of all of the current resources to the second task set, management of thread allocation for the current resource downloading tasks may be achieved to thereby avoid the influence of the insufficiency of the number of the unoccupied threads available for downloading the current resources on the download of the current resources.

Furthermore, considering that the current resources are resources to which access is initiated by the client, the loading order of the client for the current resources is the order it initiates the access requests, and downloading tasks of the current resources generated previous are tasks that are more urgently needed to be executed by the client as compared with downloading tasks of current resources generated later; therefore, on the basis that the aforesaid current resource downloading tasks are added to the second task set for processing, it is also possible to allocate threads for individual downloading tasks in the second task set in an order from the first to the last according to the times when the individual downloading tasks are added to the second task set. Specifically, step 403 may for example include: in response to the current resources not existing locally on the client, adding a second downloading task for downloading the current resources to a second task set; allocating threads for individual downloading tasks in the second task set from unoccupied threads available for downloading the current resources in an allocation order of the second task set; in response to the second downloading task being allocated with the second thread, taking out the second downloading task from the second task set and downloading the current resources locally to the client using the second thread. Wherein, the allocation order of the second task set is an order formed by arranging the individual downloading tasks in the second task set from the first to the last according to the times when the individual downloading tasks are added to the second task set. At this point, regarding a second downloading task, in the cast that the second downloading task is the first downloading task added to the second task set and currently there exist unoccupied threads available for downloading the current resources, the second downloading task may be allocated with the second thread. In other words, the tasks in the task queue of the second task set are first in first out (FIFO).

Step 404: in response to the current resources being allocated with the second thread and there existing unoccupied threads available for downloading the predicted resources, allocating a first thread from the unoccupied threads available for downloading the predicted resources, and downloading the predicted resources locally to the client using the first thread.

It may be appreciated that since the current resources are resources to be loaded by the client when access is initiated, whereas the predicted resources are only resources for which access may possibly be initiated by the client next, the current resources are resources more urgently required by the client as compared with the predicted resources. Therefore, in order to achieve preferential download of the current resources relative to the predicted resources, step 403 may be performed first to allocate the second thread for downloading the current resources; and in the case that all of the current resources have been allocated with threads and there is no current resource that has not been allocated with a thread, if there are still unoccupied threads for downloading the predicted resources, step 404 may be performed to allocate the first thread for downloading the predicted resources.

In some embodiments of the present example, based on the aforementioned embodiment of the first task set and the second task set, the process of adding a downloading task to a task set may be performed separately from the process of taking a downloading task out of a task set. For example, when the client initiates an access request, if neither of the current resources and predicted resources of the access request is locally on the client, the downloading tasks of the current resources may be added to the second task set while the downloading tasks of the predicted resources may be added to the first task set to complete the addition of the downloading tasks into the task sets. When there are unoccupied threads for downloading the current resources, the downloading tasks of the current resources in the second task set may be allocated with threads first, and the downloading tasks allocated with threads may be taken out from the second task set. When the second task set does not have any downloading task and there are still unoccupied threads available for downloading the predicted resources, then the downloading tasks of the predicted resources in the first task set may be allocated with threads, and the downloading tasks allocated with threads may be taken out from the first task set. Furthermore, when neither of the first task set and the second task set have any downloading tasks and there are still unoccupied threads available for downloading random resources, it is also possible to randomly select resources not existing locally on the client as the random resources, and allocate threads for downloading tasks of the random resources.

It may be appreciated that after a downloading task of a predicted resource is added to the first task set, usually the downloading task is allocated with a thread after a certain time period. Sometimes in this time period, the client may initiate an access request for the predicted resource, whereupon the predicted resource will be regarded as a current resource and its downloading task will be added to the second task set, which causes the first task set and the second task set to have downloading tasks of the same resource. Since for thread allocation, the second task set is in preference to the first task set, for the downloading tasks of the same resource in the two task sets, the one in the second task set is usually performed first, whereupon after the downloading task of the resource in the second task set is allocated with a thread, the downloading task thereof in first task set may not be allocated with a thread anymore and not be performed anymore.

Moreover, in order to avoid the failure of timely performing the downloading tasks of the current resources generated later due to the occupation of threads by the downloading tasks of the predicted resources and random resources generated previously, a part of the threads may be made to be allocated only to the downloading tasks of the current resources, and this part of the threads will not be allocated to the downloading tasks of the predicted resources and random resources even if no downloading task of the current resources needs to be allocated with a thread, thereby ensuring that subsequently-generated downloading tasks of the current resources can obtain threads timely. In other words, as mentioned above, the threads of the client available for downloading resources may for example include universal threads and dedicated threads, wherein the universal threads may be used to download the current resources, the predicted resources and the random resources, and the dedicated threads may only be used to download the current resources.

With the technical solution of the present example, on the basis of downloading in advance the predicted resources that may be accessed by the client after accessing the current resources, the download of the current resources for which the client initiates an access may be preferential to the download of predicted resources to which the client may possibly access, thereby ensuring that the client can timely load the current resources to which it currently initiates an access request, and avoiding the increase of the loading delay of the client caused by the predicted resources seizing the downloading threads of the current resources when the current resources and the predicted resources are downloaded simultaneously.

Figure 5:
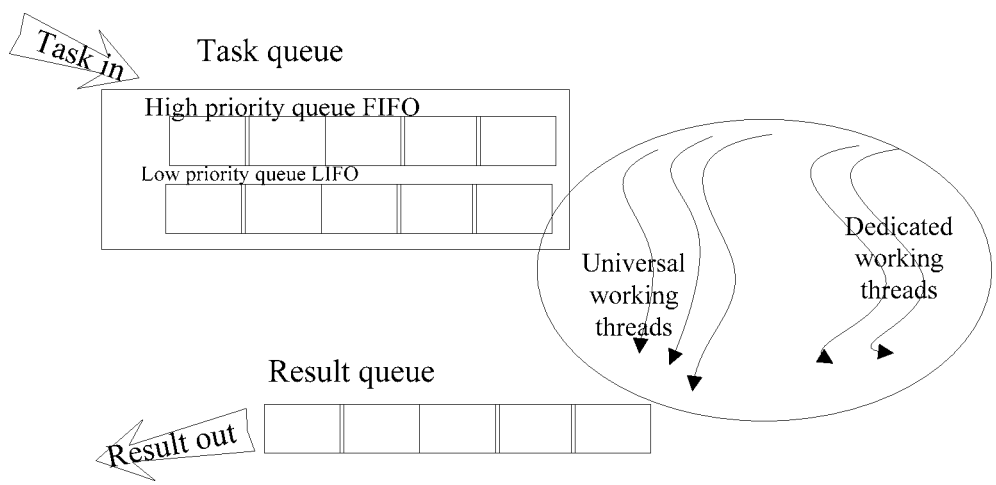
FIG. 5 schematically illustrates a schematic diagram of a processing mode of a downloading task in a specific application scenario of the invention.

To allow those skilled in the art to more clearly understand the embodiments of the resource downloading method of the present invention, the exemplary method is described below with a specific application scenario. In this application scenario, as shown in FIG. 5, for a current resource to which access is initiated by the client, its downloading task will be added to a high priority queue (i.e., an example of the aforesaid second task set); for a predicted resource that has been found, its downloading task will be added to a low priority queue (i.e., an example of the aforesaid first task set). When there is no downloading task in both of the high and low priority queues, unoccupied threads may be used to download random resources. Wherein, the high priority queue employs FIFO, and the low priority queue employs LIFO. The threads in thread pool may be divided into universal threads and dedicated threads, wherein the dedicated threads are only used to download the current resources, and the universal threads are used to download the current resources, the predicted resources and the random resources.

Figure 6:
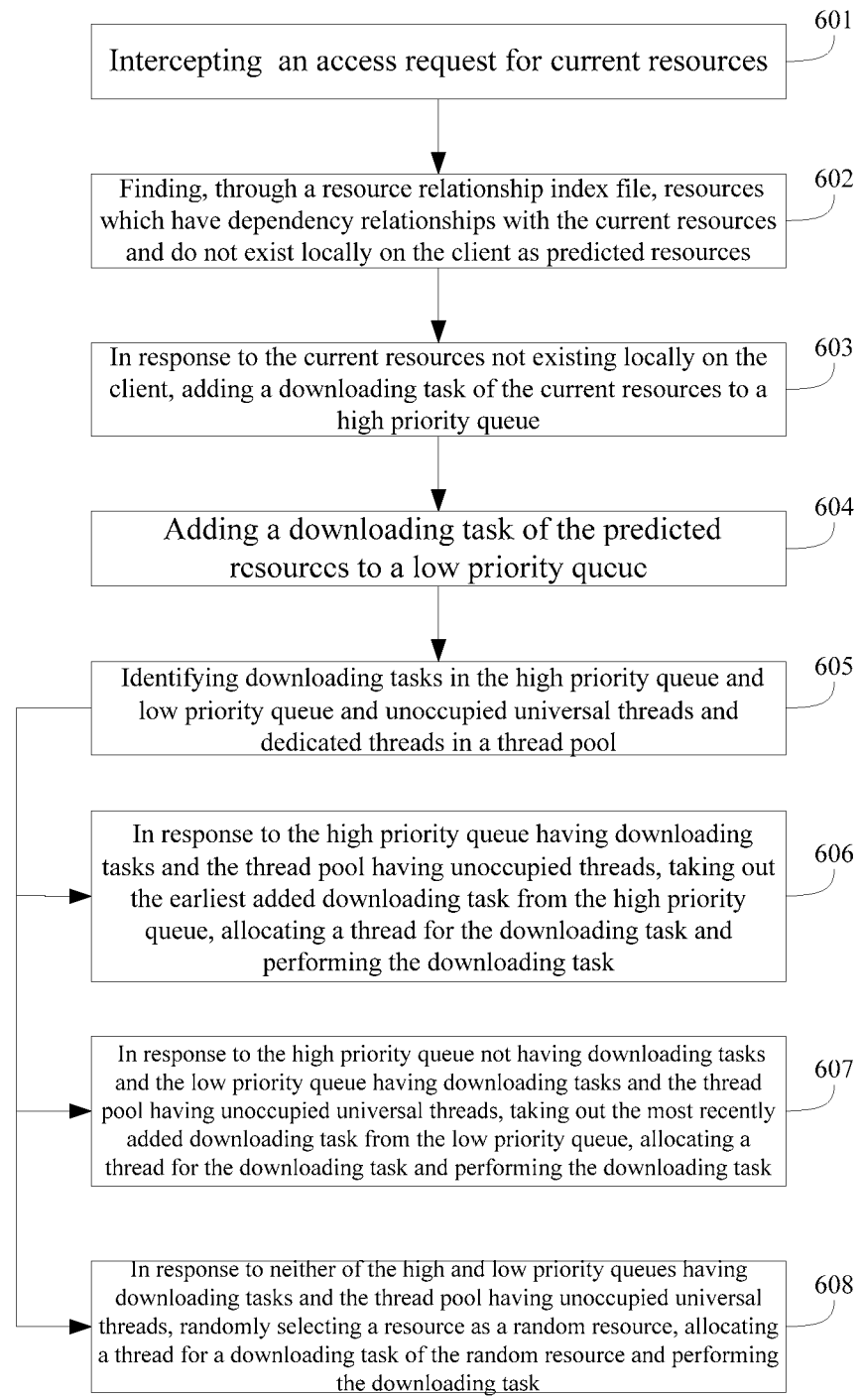
FIG. 6 schematically illustrates a flow diagram of another example of the resource downloading method of the invention.

Specifically, referring to FIG. 6, there is shown a flow diagram of another example of the resource downloading method of the invention. In this example, the method may for example include the following steps:

Step 601: intercepting an access request for current resources.

Step 602: finding, through a resource relationship index file, resources which have dependency relationships with the current resources and do not exist locally on the client as predicted resources.

Step 603: in response to the current resources not existing locally on the client, adding a downloading task of the current resources to a high priority queue.

It may be appreciated that, when the current resources exist locally on the client, the client may directly read and load the current resources locally, without having to add the downloading task of the current resources to the high priority queue.

Step 604: adding a downloading task of the predicted resources to a low priority queue.

It may be appreciated that steps 601-604 are a downloading task addition process for an access request. During the actual running of the client, for each access request, the client may perform steps 601-604 one time. Furthermore, if the client simultaneously initiates a plurality of access requests, it may also simultaneously perform steps 601-604 for the plurality of access requests, respectively.

Step 605: identifying downloading tasks in the high priority queue and low priority queue and unoccupied universal threads and dedicated threads in a thread pool.

It should be noted that, after the performance of step 605 is completed, it is possible to proceed to step 606, step 607 or step 608 depending on the identified situation. Specifically, when the high priority queue has downloading tasks and the thread pool has unoccupied threads, the process may proceed to step 606; when the high priority queue does not have downloading tasks and the low priority queue has downloading tasks and the thread pool has unoccupied universal threads, the process may proceed to step 607; and when neither of the high and low priority queues has downloading tasks and the thread pool has unoccupied universal threads, the process may proceed to step 608.

Step 606: in response to the high priority queue having downloading tasks and the thread pool having unoccupied threads, taking out the earliest added downloading task from the high priority queue, allocating a thread for the downloading task and performing the downloading task.

Wherein, no matter whether the unoccupied threads in the thread pool are universal threads or dedicated threads, they may be allocated to the downloading tasks in the high priority queue. It may be appreciated that, after the completion of a downloading task, the thread occupied by it may be released, and the current resources downloaded by it may be added to a result queue so as to store the current resources to a corresponding storage location locally on the client.

Step 607: in response to the high priority queue not having downloading tasks and the low priority queue having downloading tasks and the thread pool having unoccupied universal threads, taking out the most recently added downloading task from the low priority queue, allocating a thread for the downloading task and performing the downloading task.

Wherein, only the unoccupied universal threads in the thread pool may be allocated to the downloading tasks in the low priority queue. If the unoccupied threads in the thread pool are only the dedicated threads, the downloading tasks in the low priority queue at this point cannot be allocated with threads. It may be appreciated that, after the completion of a downloading task, the thread occupied by it may be released, and the predicted resources downloaded by it may be added to the result queue so as to store the predicted resources to a corresponding storage location locally on the client.

Step 608: in response to neither of the high and low priority queues having downloading tasks and the thread pool having unoccupied universal threads, randomly selecting a resource as a random resource, allocating a thread for a downloading task of the random resource and performing the downloading task.

Wherein, only the unoccupied universal threads in the thread pool may be allocated to the downloading task of the random resource. If the unoccupied threads in the thread pool are only the dedicated threads, the downloading task of the random resource at this point cannot be allocated with a thread. Furthermore, the randomly selected random resource may for example be randomly selected from resources contained in a resource pack read by the client most recently that do not yet exist locally on the client.

It may be appreciated that after the completion of the downloading task, the thread occupied by it may be released, and the random resources downloaded by it may be added to the result queue so as to store the random resources to a corresponding storage location locally on the client.

It should be noted that, steps 605-608 are a thread allocation and performance process of the downloading tasks. As the situations of the downloading tasks in the high and low priority queues and occupation and release of threads in the thread pool change constantly, steps 605-608 need to be performed constantly during the running of the client until the download of the full client is completed.

In the present example, steps 601-604 perform a downloading task addition process, and steps 605-608 perform a downloading task thread allocation and performance process. Due to the introduction of the queues, the performance of the two processes may be independent from each other. Hence, step 605 may be performed constantly during the running of the client, instead of being performed upon the completion of the performance of step 604.

With the technical solution of the present example, the unoccupied threads may be used to download in advance the predicted resources that may be accessed by the client after accessing the current resources, which on the one hand, shortens the loading delay of the resource loading process, and on the other hand, allows the unoccupied threads upon requesting to access the current resources to be used to download the predicted resources, thereby avoiding the waste of downloading threads. On this basis, the resources urgently needed by the client may be preferentially downloaded according to the degree of urgency of the demand of the client for resources, thereby avoiding the issue of increased delay when the client loads a part of the resources caused by non-urgently needed resources seizing threads of urgently needed resources.

It may be appreciated that many network applications perform program and resource update for their clients by way of using patching. In order to save the amount of downloading, a patch file generally only records patch data of differences between two versions of the client. However, for a client employing the micro-end technology, since the client is incomplete over a period of time, in the case that the client is incomplete, the client usually has not downloaded original data to be modified by a part of the patch data in the patch file. In order to enable the incomplete client to accommodate the original patching mechanism without modifying the original patching mechanism, the incomplete client may be made to record the original data that is to be modified by the patch file and not yet downloaded locally to the client, and apply the patch file according previous record after the client locally downloads the original data.

Figure 7:
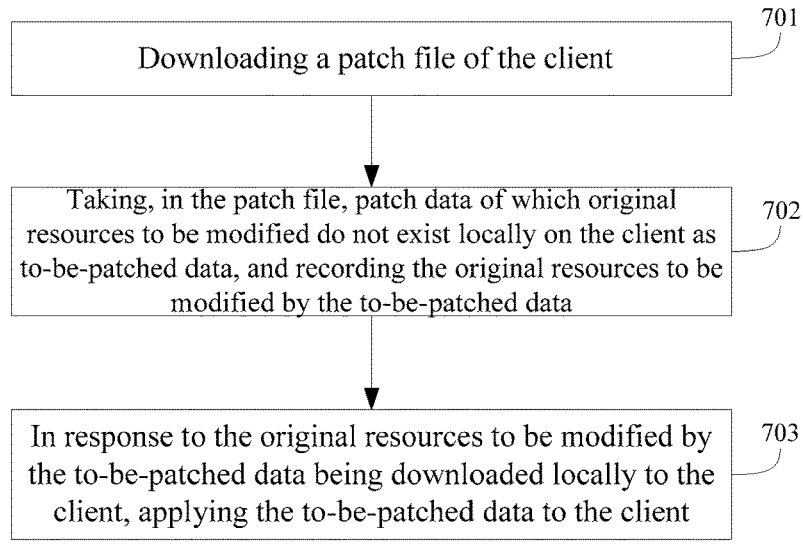
FIG. 7 schematically illustrates a flow diagram of another example of the resource downloading method of the invention.

Specifically, referring to FIG. 7, there is shown a flow diagram of another example of the resource downloading method of the invention. In this example, the method may for example include the following steps:

Step 701: downloading a patch file of the client.

Usually, a patch file has a plurality of patch data, respectively used for updating the original client in different manners. For example, some patch data are used to modify (e.g., which may include replacement or deletion) original data in the original client, and some patch data are used to add a segment of new data on the original client.

Step 702: taking, in the patch file, patch data of which original resources to be modified do not exist locally on the client as to-be-patched data, and recording the original resources to be modified by the to-be-patched data.

Specifically, the client may perform analysis for the original resources to be updated by the patch file based on data segment, select from them the original resources which do not exist locally on the client and are to be modified by the patch file, and record the original resources through a file name of the location of the original resources, offset and length. Of course, meanwhile the patch data in the patch file for modifying the original resources also needs to be recorded as the to-be-patched data.

Figure 8:
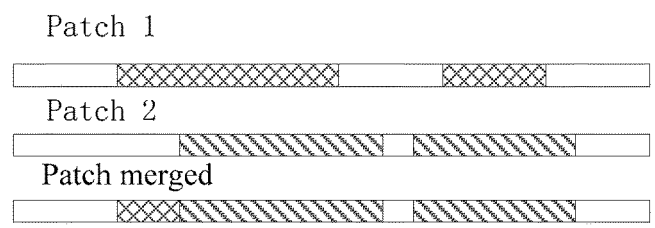
FIG. 8 schematically illustrates a schematic diagram of an instance of the merger of to-be-patched data of the invention.

It may be appreciated that, sometimes for an original resource not downloaded by the client, the client has already received patch files for modifying it for multiple times, so that the client has recorded a plurality of to-be-patched data for modifying the original resource. At this point, in some embodiments, the to-be-patched data of the same original resource may be merged, and the merged to-be-patched data may be applied after the client downloads the original resource. Wherein, what is retained in each data segment of the merged to-be-patched data is the patch data in the most recently received patch file. For example, in the example as shown in FIG. 8, the portion "▨" in "Patch1" is the to-be-patched data of a previously-received patch file for a certain segment of original resource, the portion "▨" in "Patch2" is the to-be-patched data of a later-received patch file for the same original file, and the merged to-be-patched data is as shown by "Patch merged".

Step 703: in response to the original resources to be modified by the to-be-patched data being downloaded locally to the client, applying the to-be-patched data to the client.

Specifically, it may be determined, according to the pre-recorded file name of the locations of the original resources, offset and length, that the client has already downloaded the original resources to be modified by the to-be-patched data, and then the to-be-patched data may be applied to the client so that the original resources are modified by the to-be-patched resources.

It should be noted that, in the patch file, some patch data may be directly applied by the client upon reception of the patch file. Upon reception of the patch file, by analyzing the original resources to be updated by the patch file on the data segment basis, for example in some embodiments, it is also possible to take patch data in the patch file of which original resources to be modified exist locally on the client as first immediate patch data, and apply the first immediate patch data to the client. For another example, in some other embodiments, it is also possible to take patch data in the patch file for adding resources for the client as second immediate patch data, and apply the second immediate patch data to the client. For another example, in some other embodiments, it is also possible to take patch data in the patch file with length exceeding a file segment as third immediate patch data, and apply the third immediate patch data to the client.

Furthermore, it may be appreciated that the way of applying the patch file by the client in the present invention may be combined with any of the above-mentioned embodiments of client resource downloading, and the present invention is not limited in this respect.

As compared with the patching scheme of entirely replacing a file or a file block, with the technical solution of the present invention, there is no problem of the amount of patch downloading being too large caused by the patch file being too large, and there is no problem of the preparation time of patches being too long caused by the necessity of entirely downloading the original file or file block, and there is no need to even modify the original patching mechanism that does not perform entirely replacement by file or file block, so that the client employing the micro-end technology has a timely patching scheme with less modification.

Having presented the methods of the exemplary embodiments of the invention, apparatuses for resource downloading of the exemplary embodiments of the invention will then be described with reference to FIGS. 9-13.

Figure 9:
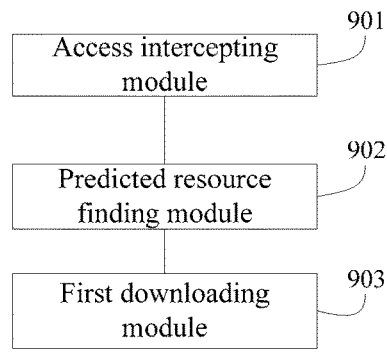
FIG. 9 schematically illustrates a structure diagram of an example of the resource downloading apparatus of the invention.

Referring to FIG. 9, there is shown a structure diagram of an example of the resource downloading apparatus of the invention. In the present example, the apparatus may for example specifically include:

an access intercepting module 901 for intercepting an access request for current resources;

a predicted resource finding module 902 for finding, through a resource relationship index file, resources which have dependency relationships with the current resources and do not exist locally on the client as predicted resources, wherein the resource relationship index file is generated in advance according to dependency relationships between individual resources in the full client of a network application; and a first downloading module 903 for allocating a first thread from unoccupied threads available for downloading the predicted resources, and downloading the predicted resources locally to the client using the first thread.

Wherein, optionally, in some embodiments of the present invention, the first downloading module may for example specifically include:

a first set adding submodule for adding a first downloading task for downloading the predicted resources to a first task set; and a first set taking-out submodule for, in response to the first downloading task being allocated with the first thread, taking out the first downloading task from the first task set and downloading the predicted resources locally to the client using the first thread.

Wherein, further optionally, in some other embodiments of the invention, threads may be allocated for individual downloading tasks in the first task set in an order from the last to the first according to the times when the individual downloading tasks are added to the first task set.

Figure 10:
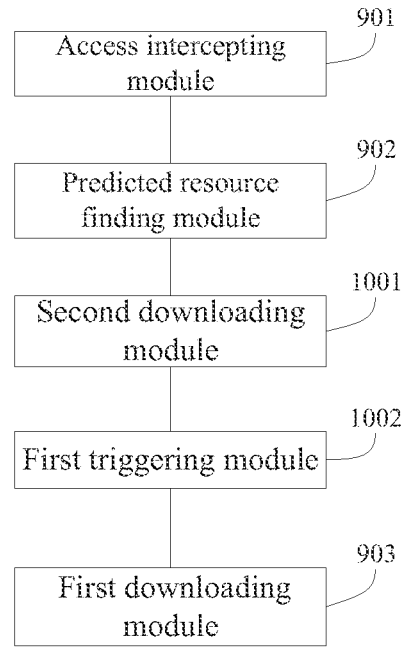
FIG. 10 schematically illustrates a structure diagram of another example of the resource downloading apparatus of the invention.

Referring to FIG. 10, there is shown a structure diagram of another example of the resource downloading apparatus of the invention. In this example, in addition to all the structures as shown in FIG. 9, the apparatus may for example specifically further include:

a second downloading module 1001 for, in response to the current resources not existing locally on the client, allocating a second thread from unoccupied threads available for downloading the current resources, and downloading the current resources locally to the client using the second thread; and a first triggering module 1002 for, in response to the current resources being allocated with the second thread and there existing unoccupied threads available for downloading the predicted resources, triggering the first downloading module 903.

Wherein, optionally, in some embodiments of the present invention, the second downloading module may for example specifically include:

a second set adding submodule for, in response to the current resources not existing locally on the client, adding a second downloading task for downloading the current resources to a second task set; and a second set taking-out submodule for, in response to the second downloading task being allocated with the second thread, taking out the second downloading task from the second task set and downloading the current resources locally to the client using the second thread.

Wherein, further optionally, in some other embodiments of the present invention, threads may be allocated for individual downloading tasks in the second task set in an order from the first to the last according to the times when the individual downloading tasks are added to the second task set.

Figure 11:
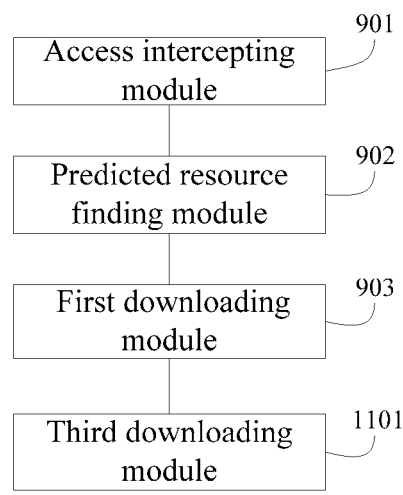
FIG. 11 schematically illustrates a structure diagram of another example of the resource downloading apparatus of the invention.

Referring to FIG. 11, there is shown a structure diagram of another example of the resource downloading apparatus of the invention. In this example, in addition to all the structures as shown in FIG. 9, the apparatus may for example specifically further include:

a third downloading module 1101 for, in response to the predicted resources being allocated with the first thread and there existing unoccupied threads available for downloading random resources, randomly selecting resources not existing locally on the client as the random resources, and downloading the random resources using the unoccupied threads available for downloading random resources.

Wherein, in some embodiments of the apparatus of the invention, threads of the client available for downloading resources may include universal threads and dedicated threads, the universal threads can be used to download the current resources, the predicted resources and the random resources, and the dedicated threads can only be used to download the current resources.

Figure 12:
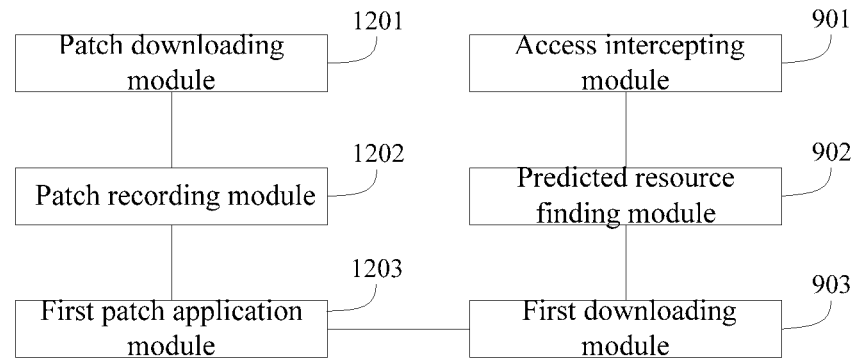
FIG. 12 schematically illustrates a structure diagram of another example of the resource downloading apparatus of the invention.

Referring to FIG. 12, there is shown a structure diagram of another example of the resource downloading apparatus of the invention. In this example, in addition to all the structures as shown in FIG. 9, the apparatus may for example specifically further include:

a patch downloading module 1201 for downloading a patch file of the client;

a patch recording module 1202 for taking, in the patch file, patch data of which original resources to be modified do not exist locally on the client as to-be-patched data, and recording the original resources to be modified by the to-be-patched data; and a first patch application module 1203 for, in response to the original resources to be modified by the to-be-patched data being downloaded locally to the client, applying the to-be-patched data to the client.

Figure 13:
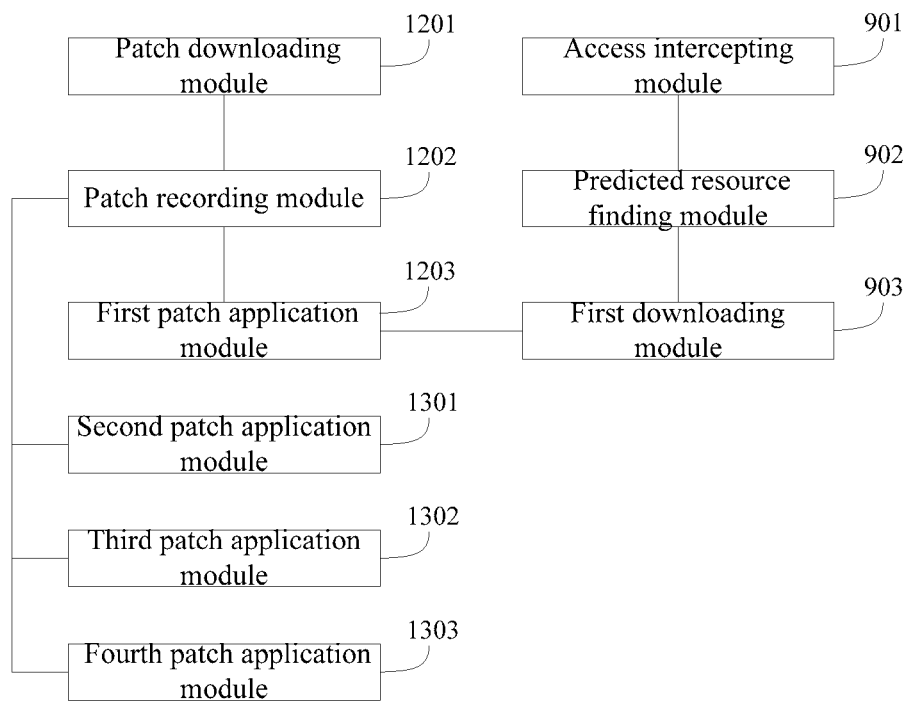
FIG. 13 schematically illustrates a structure diagram of another example of the resource downloading apparatus of the invention.

Referring to FIG. 13, there is shown a structure diagram of another example of the resource downloading apparatus of the invention. In this example, in addition to all the structures as shown in FIG. 12, the apparatus may for example specifically further include:

a second patch application module 1301 for taking, in the patch file, patch data of which original resources to be modified exist locally on the client as first immediate patch data, and applying the first immediate patch data to the client;

a third patch application module 1302 for taking, in the patch file, patch data for adding resources for the client as second immediate patch data, and applying the second immediate patch data to the client; and a fourth patch application module 1303 for taking, in the patch file, patch data with length exceeding a file segment as third immediate patch data, and applying the third immediate patch data to the client.

With the examples of the exemplary apparatus of the present invention, since the predicted resources having dependency relationships with the current resources are resources to be accessed after the current resources are accessed, on the one hand, the predicted resources which need to be accessed after the current resources are accessed and do not exist locally may be downloaded in advance when the client initiates an access request for the current resources, without having to wait until the client initiates an access request for the predicted resources after accessing and parsing the current resources to download the predicted resources, thereby significantly reducing the number of resource downloading required when the client initiates an access request during the resource loading process, accelerating the speed of the initial loading of client resources, and shortening the loading delay of the resource loading process; on the other hand, threads not occupied when access to the current resources are requested may be used to download the predicted resources, thereby avoiding the waste of downloading threads.

Furthermore, as compared with the patching scheme of entirely replacing a file or a file block, in some embodiments of the apparatus of the invention, there is no problem of the amount of patch downloading being too large caused by the patch file being too large, and there is no problem of the preparation time of patches being too long caused by the necessity of entirely downloading the original file or file block, and there is no need to even modify the original patching mechanism that does not perform entirely replacement by file or file block, so that the client employing the micro-end technology has a timely patching scheme with less modification.

It should be noted that, although a number of modules or submodules for the resource downloading apparatus have been set forth in the above detailed description, such division is merely exemplary and non-mandatory. In fact, the features and functionalities of two or more of the modules described above may be embodied in a single module, in accordance with the embodiments of the invention. Conversely, the features and functionalities of a single module described above may be further divided to be embodied by a plurality of modules.

Moreover, although the operations of the method of the present invention have been described in a specific order in the drawings, this does not require or imply that those operations are necessarily performed in such specific order, or that all of the illustrated operations have to be performed to achieve desired results. Additionally or alternatively, certain steps may be omitted, a plurality of steps may be combined and performed in a single step, and/or a single step may be broken up into and performed in a plurality of steps.

Although the spirit and principles of the present invention have been described with reference to a number of specific embodiments, it should be understood that the present invention is not limited to the disclosed specific embodiments, and the division of various aspects does not mean that features in those aspects cannot be combined to benefit, and such division is merely for the convenience of presentation. The present invention is intended to cover various modifications and equivalent arrangements within the spirit and scope of the appended claims.

What is claimed is:

1. A method, comprising:
   A) intercepting an access request for current resources;
   B) finding, through a resource relationship index file, resources which have dependency relationships with the current resources and do not exist locally on the client as predicted resources, wherein the resource relationship index file is generated in advance according to dependency relationships between individual resources in a full client of a network application;
   C) allocating a first thread from unoccupied threads available for downloading the predicted resources, and downloading the predicted resources locally to the client using the first thread; and
   in response to the predicted resources being allocated with the first thread and there existing unoccupied threads available for downloading random resources, randomly selecting resources not existing locally on the client as the random resources, and downloading the random resources using the unoccupied threads available for downloading random resources.

2. The method according to claim 1, wherein step C) comprises:
   adding a first downloading task for downloading the predicted resources to a first task set; and
   in response to the first downloading task being allocated with the first thread, taking out the first downloading task from the first task set and downloading the predicted resources locally to the client using the first thread.

3. The method according to claim 2, wherein, threads are allocated for individual downloading tasks in the first task set in an order from the last to the first according to the times when the individual downloading tasks are added to the first task set.

4. The method according to claim 1, further comprising:
   in response to the current resources not existing locally on the client, allocating a second thread from unoccupied threads available for downloading the current resources, and downloading the current resources locally to the client using the second thread; and
   in response to the current resources being allocated with the second thread and there existing unoccupied threads available for downloading the predicted resources, proceeding to step C).

5. The method according to claim 4, said in response to the current resources not existing locally on the client, allocating a second thread from unoccupied threads available for downloading the current resources, and downloading the current resources locally to the client using the second thread comprises:
   in response to the current resources not existing locally on the client, adding a second downloading task for downloading the current resources to a second task set; and
   in response to the second downloading task being allocated with the second thread, taking out the second downloading task from the second task set and downloading the current resources locally to the client using the second thread.

6. The method according to claim 5, wherein, threads are allocated for individual downloading tasks in the second task set in an order from the first to the last according to the times when the individual downloading tasks are added to the second task set.

7. The method according to claim 1, wherein, threads of the client available for downloading resources comprise universal threads and dedicated threads, the universal threads can be used to download the current resources, the predicted resources and the random resources, and the dedicated threads can only be used to download the current resources.

8. The method according to claim 1, further comprising:
   downloading a patch file of the client;
   taking, in the patch file, patch data of which original resources to be modified do not exist locally on the client as to-be-patched data, and recording the original resources to be modified by the to-be-patched data; and
   in response to the original resources to be modified by the to-be-patched data being downloaded locally to the client, applying the to-be-patched data to the client.

9. The method according to claim 8, further comprising:
   taking, in the patch file, patch data of which original resources to be modified exist locally on the client as first immediate patch data, and applying the first immediate patch data to the client;
   taking, in the patch file, patch data for adding resources for the client as second immediate patch data, and applying the second immediate patch data to the client; and
   taking, in the patch file, patch data with length exceeding a file segment as third immediate patch data, and applying the third immediate patch data to the client.

10. An apparatus, comprising:
    a memory that stores a plurality of instructions; and
    a processor coupled to the memory and configured to execute the instructions to:
    intercept an access request for current resources;
    find, through a resource relationship index file, resources which have dependency relationships with the current resources and do not exist locally on the client as predicted resources, wherein the resource relationship index file is generated in advance according to dependency relationships between individual resources in a full client of a network application;
    allocate a first thread from unoccupied threads available for downloading the predicted resources, and download the predicted resources locally to the client using the first thread; and in response to the predicted resources being allocated with the first thread and there existing unoccupied threads available for downloading random resources, randomly select resources not existing locally on the client as the random resources, and download the random resources using the unoccupied threads available for downloading random resources.

11. The apparatus according to claim 10, wherein, the processor is further configured to execute the instructions to:
add a first downloading task for downloading the predicted resources to a first task set; and
in response to the first downloading task being allocated with the first thread, take out the first downloading task from the first task set and download the predicted resources locally to the client using the first thread.

12. The apparatus according to claim 11, wherein, threads are allocated for individual downloading tasks in the first task set in an order from the last to the first according to the times when the individual downloading tasks are added to the first task set.

13. The apparatus according to claim 10, wherein, the processor is further configured to execute the instructions to:
in response to the current resources not existing locally on the client, allocate a second thread from unoccupied threads available for downloading the current resources, and download the current resources locally to the client using the second thread; and
in response to the current resources being allocated with the second thread and there existing unoccupied threads available for downloading the predicted resources, allocate a first thread from unoccupied threads available for downloading the predicted resources, and download the predicted resources locally to the client using the first thread.

14. The apparatus according to claim 13, wherein, the processor is further configured to execute the instructions to:
in response to the current resources not existing locally on the client, add a second downloading task for downloading the current resources to a second task set; and
in response to the second downloading task being allocated with the second thread, take the second downloading task from the second task set and download the current resources locally to the client using the second thread.

15. The apparatus according to claim 14, wherein, threads are allocated for individual downloading tasks in the second task set in an order from the first to the last according to the times when the individual downloading tasks are added to the second task set.

16. The apparatus according to claim 10, wherein, threads of the client available for downloading resources comprise universal threads and dedicated threads, the universal threads can be used to download the current resources, the predicted resources and the random resources, and the dedicated threads can only be used to download the current resources.

17. The apparatus according to claim 10, wherein, the processor is further configured to execute the instructions to:
download a patch file of the client;
take, in the patch file, patch data of which original resources to be modified do not exist locally on the client as to-be-patched data, and record the original resources to be modified by the to-be-patched data; and
in response to the original resources to be modified by the to-be-patched data being downloaded locally to the client, apply the to-be-patched data to the client.

18. The apparatus according to claim 17, wherein, the processor is further configured to execute the instructions to:
take, in the patch file, patch data of which original resources to be modified exist locally on the client as first immediate patch data, and apply the first immediate patch data to the client;
take, in the patch file, patch data for adding resources for the client as second immediate patch data, and apply the second immediate patch data to the client; and
take, in the patch file, patch data with length exceeding a file segment as third immediate patch data, and apply the third immediate patch data to the client.

* * * * *